Aug. 10, 1965 E. S. WEIBEL 3,200,268

HIGH CURRENT GENERATOR ARRANGEMENT

Filed Nov. 20, 1961

ERICH S. WEIBEL
*INVENTOR.*

BY David P. Ogden

ATTORNEY.

United States Patent Office 3,200,268
Patented Aug. 10, 1965

3,200,268
HIGH CURRENT GENERATOR ARRANGEMENT

Erich S. Weibel, Pully, Vaud, Switzerland, assignor to The Aerospace Corporation, Los Angeles, Calif., a corporation of California Filed Nov. 20, 1961, Ser. No. 154,395
6 Claims. (Cl. 307—104)

The present invention relates to power supplies useful in the magnetohydrodynamics art and more particularly to a high current step generator of the type useful in developing and maintaining high magnetic fields.

Fast rising, high magnetic fields are very useful in heating and containing conducting gases of interest in controlled fusion research. Since the temperatures involved in thermonuclear processes are of the order of $10^8$ degrees K., conventional heating techniques are not suitable for bringing the gases to the high temperature levels. It has been found that the high temperature levels are obtainable by accelerating particles of a gaseous medium to high kinetic energies and then compressing them to a small volume. One acceptable technique, using an ionized gas (a plasma) within a selected volume, almost instantaneously establishes a high density current flow through the plasma. This high density current establishes a magnetic field which very rapidly constricts the plasma, with the construction usually being referred to as the "pinch effect." One of the most severe problems in studies of the plasma pinch effect is that of maintaining the pinch effect for a substantial observation time duration.

The present state of the art recognizes the use of "crow-barring" to establish a pinch effect within a plasma. Crowbarring is accomplished by discharging a capacitor through a low impedance inductive load and then short circuiting the load during maximum current flow. However, the duration of the established current is limited by the circuit parameters necessary to develop a sufficiently large current in a minimum rise time. The presently accepted parameters require current generators to have a rise time of less than one microsecond and require the current to remain nearly constant for observation periods of the order of at least about 100 microseconds. As will become apparent from the following detailed description, simple crowbarring techniques having a rise time of less than one microsecond do not readily maintain the current flow for periods approaching a 100 microsecond duration.

Various attempts to overcome the limitation on these power supplies have resulted in numerous innovations, none of which have proved entirely satisfactory. For instance, the use of parallel delay lines having suitable rise time characteristics and suitable impedance characteristics to obtain currents of the order of $3\times10^4$ amperes with a rise time of less than one microsecond do not fulfill the extended constant current flow characteristic. Moreover, the use of delay lines produces a sequence of pulses of alternating polarity whereby only the first pulse is useful and the remaining energy of the system is wasted. Attempts to use additional capacitors in a suitable high current generator system result in undesirable side effects whereby high current flow decays appreciably within the necessary 100 microsecond observation period.

It is, therefore, an object of my invention to provide a new and improved high current step generator power source of the type used for initiating and maintaining a high energy plasma.

According to one embodiment of the present invention, a load inductor is energized to conduct a large load current flow by means of a capacitor, with this combination of elements including the essentials to attain crowbarring. However, prior to the short circuiting of the load inductor, a second larger auxiliary inductor is energized in a manner developing a substantially identical current flow therein at the instant the shunting of the load inductor occurs. Thus the two inductors may be placed in a series circuit loop whereby the established load current flow will be maintained by inductive forces much greater than those in the load inductor alone. It should be recognized that although the load inductor must have a rise time of the order of a microsecond or less, the rise time of the larger auxiliary inductor is of little consequence because of the isolation between the circuits during the starting sequence.

The subject matter which is regarded as this invention is particularly pointed out and distinctly claimed in the concluding portion of the specification. The invention, however, as to its organization and operation, together with further objects and advantages thereof, will best be understood by reference to the following description taken in connection with the accompanying drawing in which:

Figure 1:
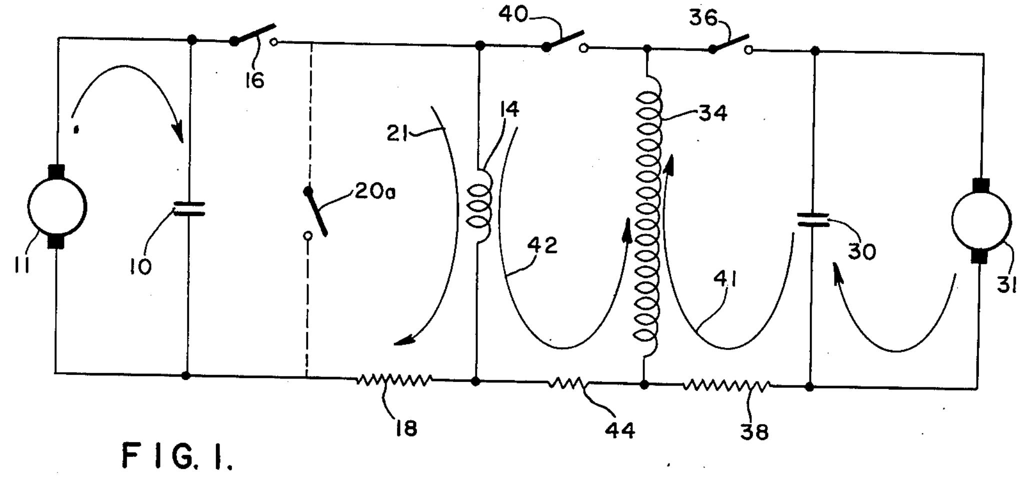
FIG. 1 is a simple circuit diagram illustrating the operative components useful in the present invention.

Referring now to the drawing, in FIG. 1 I have shown a simplified circuit means for developing a rapidly rising magnetic flux. A current source such as a capacitor 10 is coupled to a unidirectional charging source such as a D.C. generator 11. The impedance characteristics of the generator 11 are comparatively large and therefore do not affect the characteristics of the rest of the circuit. Prior to discharging the capacitor 10, the generator 11 charges the capacitor 10 to a voltage $V_{11}$. At the instant before the pinch effect is to be initiated, a plasma containing load device shown as a load inductor 14 is coupled to the fully charged capacitor 10 by a high speed switch means 16 such as a spark gap switch or an ignitron tube. Thus the load inductor 14 has produced therein a rapidly rising high current flow. The impedance of the circuit of the switch 16 includes the capacitance $C_{10}$ of the capacitor 10, the inductance $L_{14}$ of the inductor 14, and the over-all circuit resistance $R_{18}$ indicated schematically as a small resistor 18. The entire impedance of this circuit is designed to be of a value to obtain a desired fast rise time of load current flow in the inductor 14. Neglecting the small resistor 18, the rise time from instant $t_1$ to instant $t_2$ or simply $t_1—t_2$ is given by the expression $$t_1-t_2=\frac{\pi}{2}\sqrt{L_{14}C_{10}} \qquad (1)$$

In prior art circuit designs, the only other element necessary to obtain "crowbarring" is a switch 20*a* (shown in circuit by dashed lines for illustrative purposes only) with the switch 20*a* being sequentially closed at the precise instant the energizing load current flow, indicated by an arrow 21, reaches a maximum desired value, such as $3\times10^4$ amperes through the load inductor 14. The peak current $I_{21}$ is given by the expression $$I_{21}=V_{11}\sqrt{C_{10}/L_{14}} \qquad (2)$$

Equation 2 clearly indicates that the inductor 14 should be small to obtain the necessary high current flow.

Figure 2:
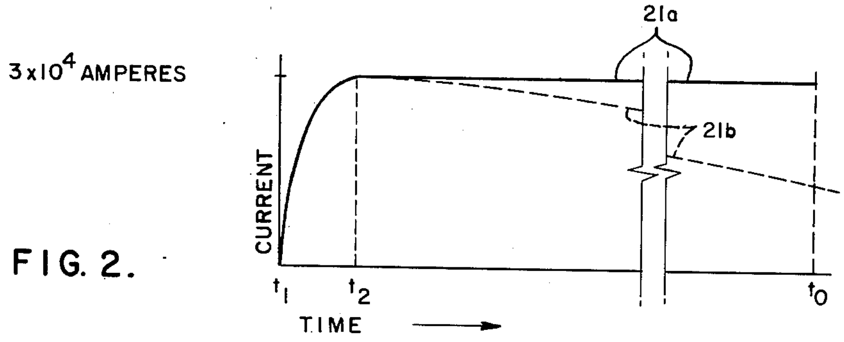
FIG. 2 is a curve illustrating both the ideal current flow characteristics and the characteristics obtainable by simple crowbarring circuits.

On the other hand, if the resistance $R_{18}$ can be made zero, the current flow 21 will continue at the maximum value for an infinite period of time as indicated by the curve 21*a* of FIG. 2 wherein the axis of the ordinates is the load current flow and the axis of the abscissa indicates the time period. However, because the inherent resistance $R_{18}$ is substantially compared to the inductance of the inductor 14 (which must be small per Equations 1 and 2), the current flow will decay rapidly, as indicated by the dash line 21*b*. The decay time $T_d$ of such a circuit is given by the expression $$T_d = L_{14}/R_{18} \quad (3)$$

For purposes of reference in connection with FIG. 2, the rise time interval from instant $t_1$ to instant $t_2$ or simply $t_1-t_2$ is of the order of one microsecond or less and a most useful observation time duration or period $t_2-t_0$ is of the order of 100 microseconds or greater. In the usual plasma generation and observation systems, the observation period $t_2-t_0$ should be made as large as practicable, whereby the inductor 14 should have as much inductance as feasible. On the other hand, the rise time $t_1-t_2$ must be made extremely small so that the plasma load may be most effectively heated. The more rapidly the load current is developed, the greater is the shock effect on the plasma load and a high rate of the current rise is essential to obtain useful heating. As shown in Equation 1, $t_1-t_2$ should be very small to obtain a high rate of current rise.

Often the inherent resistance of the system is reduced to a minimum by using circuit components having a minimum resistance (large wire diameter) consistent with the space available. However, even careful design of the components, including the load inductor 14, has not resulted in a most desirable combination to satisfy the inconsistent parameters of the system whereby both the rise time may be extremely short and the decay rate may be very low to obtain an extended observation period $t_2-t_0$.

Therefore, in accordance with the present invention, I have provided a second current source shown as a capacitor 30 and a similar unidirectional charging source or generator 31. The generator 31 charges the capacitor 30 to the voltage $V_{31}$. The current charge of the capacitor 30 is passed through another and substantially larger auxiliary inductor 34 during the period when a sequentially operable switch means 36 is closed to establish in the auxiliary inductor 34 an energizing current flow 41 substantially equal to that in the load inductor 14 at the instant $t_2$. In order to match the magnitudes of the energizing currents 21 (as shown in Equation 2) and 41, the capacitor 30 and the auxiliary inductor 34 are chosen according to the expression $$V_{11}\sqrt{\frac{C_{10}}{L_{14}}} = -V_{31}\sqrt{\frac{C_{30}}{L_{34}}} \quad (4)$$

The rise time from instant $t'_1$ (which occurs before instant $t_1$) to instant $t_2$ or simply $t'_1-t_2$ of the current $I_{41}$ is given by the expression $$t'_1 - t_2 = \frac{\pi}{2}\sqrt{L_{34}C_{30}} \quad (5)$$

and will be substantially larger than the rise time $t_1-t_2$. If $V_{11}=-V_{31}$ and if $L_{34}$ is fifty times as large as $L_{14}$, then, $C_{30}$ is fifty times as large as $C_{10}$ (Equation 4) and $t'_1-t_2$ is fifty times as large as $t_1-t_2$ (Equation 5). The portion of the circuit carrying the energization current 41 contains residual resistance indicated by a resistor 38. However, since at least a portion of this resistance $R_{38}$ is no longer in the load current series circuit loop (current 42), that portion may be greater than minimum value without affecting the decay time $T'_d$ of the present invention.

Figure 3:
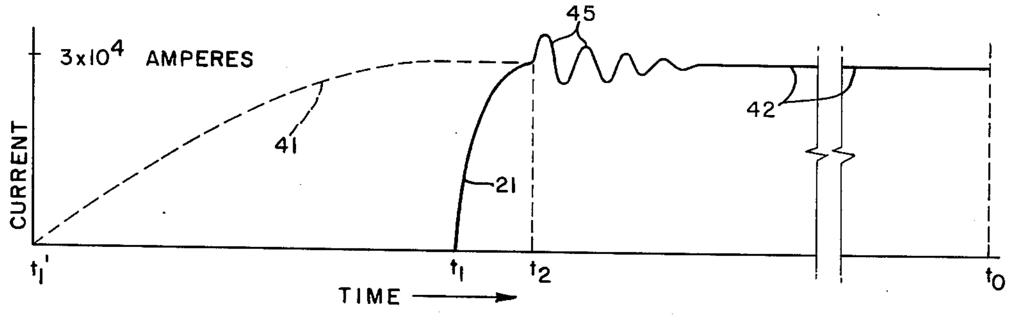
FIG. 3 is a curve illustrating the current characteristics obtainable by use of the present invention.

Moreover, the present invention does not utilize the usual crowbarring as discussed above for maintaining current flow in the load inductor 14. Instead, at the instant $t_2$ another sequentially operable coupling or switch means 40 is closed to connect the two inductors 14 and 34 in series. It should be kept in mind that the sequential operation of the switches 16, 36 and 40 is interdependent and they may be viewed as one complex switching means. With the timing of the energization switches 36 and 16 being arranged (as indicated in FIG. 3) at $t'_1$ and $t_1$, respectively, the energizing current flow in the inductors 14 and 34 will be substantially equal and in opposite directions at instant $t_2$. Thus the sequential closing of the switch 40 establishes a series circuit loop including the load inductor 14 and having a substantially increased total inductance, whereby the load current flow 42 will be maintained for an observation period of time $t_2-t_0$, giving substantial opportunity for observance of the resulting phenomena such as pinch effect. The decay time $T'_d$ of the present invention is given by the expression $$T'_d = (L_{14}+L_{34})/R_{44} \quad (6)$$

Since $L_{34}$ is substantially larger than $L_{14}$, $T'_d$ is substantially longer than $T_d$.

Because of the arrangement of the utilization circuit of the load inductor 14 in proximity with the high temperature plasma or other equivalent uses, it is often impracticable to construct this element of superconductive material and to maintain it superconductive during operation. However, the auxiliary inductor 34 may be separated spacially sufficiently from the load inductor 14 and the hot plasma to allow utilization of superconductive arrangements whereby the circuit impedance, and particularly the inherent resistance $R_{44}$ in the path of the load current flow 42 (as indicated by a resistor 44) may be made very small, while the inductance $(L_{14}+L_{34})$ of the circuit is substantially increased over the value of $L_{14}$.

It should be kept in mind that the energy absorbed by the plasma load inductance 14 (FIG. 1) will be effective as a portion of the resistance $R_{44}$. However, a plasma load, once heated, does not absorb much energy in its maintenance. As a result, the load current 42, as illustrated in FIG. 3, may be made substantially similar to the ideal current flow illustrated at 21*a* in FIG. 2 except for the relatively small transient currents 45 which are due to the inherent inductance of the capacitors and switches and which may also be generated by slight mismatching of the energizing current flows 21 and 41. These transients 45 or circulating currents continue to flow along the paths of the energizing currents 21 and 41.

For the usual load inductor arrangement contemplated with the present invention, these transients, although not desired, are generally harmless in obtaining the useful observations and effective operation. Moreover, the resistances $R_{18}$ and $R_{38}$ of the circuit will quickly dampen the transients 45 to the extent that the resistors 18 and 38 are not in the circuit of the load current flow 42, one or both of these resistors may be made larger than the normal minimum inherent resistances discussed above to dampen the transients 45 quickly.

While I have shown and described particular embodiments of the present invention, further modifications may occur to those skilled in this art. For instance, although a capacitor is shown as being coupled to the inductors to initiate the desired currents, other current sources may be used. Also, my invention may be useful in maintaining other magnetic fields which require sustaining energy, as in cyclotrons, etc. Moreover, several auxiliary inductors 34 and auxiliary current sources may be used by connecting them in parallel to obtain even larger load currents. I desire it understood, therefore, that my invention is not limited to the particular form shown, and I intend by the appended claims to cover all such modifications which do not depart from the true spirit and scope of my invention.

What is claimed is:

1. A high current step generator arrangement useful for establishing and maintaining pinch effect in load devices such as a plasma containing device, comprising: a load inductor arranged to induce rapidly rising flux in a load device; first means for inducing a load current flow of the order of thousands of amperes in said load inductor during a rise time of the order of one microsecond or less; an auxiliary inductor having substantially more inductance than said load inductor; second means for inducing in said auxiliary inductor an energizing current flow similar in magnitude to said load current flow; and means for coupling said auxiliary inductor and said load inductor in a series circuit loop at the instant when both of said current flows are substantially equal and when said load current flow first reaches its maximum value, said coupling means being arranged to establish said series circuit loop with both said load current flow and said energizing current flow flowing in the same direction therearound whereby the inductance of both of said inductors will maintain said load current flow.

2. A high current step generator arrangement for energizing a load inductor, comprising: first means for inducing a load current flow of the order of thousands of amperes in the load inductor during a rise time of the order of one microsecond or less; an auxiliary inductor being substantially more inductive than the load inductor; second means for inducing in said auxiliary inductor an energizing current flow similar in magnitude to said load current flow; and means for coupling said auxiliary inductor and the load inductor in a series circuit loop at the instant when both of said current flows are substantially equal and maximum, said coupling means being arranged to establish said series circuit loop with both said load current flow and said energizing current flow flowing in the same direction therearound whereby both of said inductors will maintain said load current flow.

3. A high current step generator arrangement useful for establishing and maintaining pinch effect in a plasma containing device comprising: a load inductor arranged to induce rapidly rising flux in a plasma containing device; a first chargeable capacitor means connectable for inducing a load current flow of the order of thousands of amperes in said load inductor during a rise time of the order of one microsecond or less; an auxiliary inductor having substantially more inductance than said load inductor; a second chargeable capacitor means connectable for inducing in said auxiliary inductor an energizing current flow similar in magnitude to said load current flow; switch means for sequentially coupling said second capacitor to said auxiliary inductor and said first capacitor to said load inductor with the sequence being such that said auxiliary inductor carries a maximum current flow at the instant said load inductor first carries its maximum load current flow; and other switch means for coupling said auxiliary inductor and said load inductor in a series circuit loop at the instant when both current flows are substantially equal and when said load current flow first reaches its maximum value, said first, second and other switch means being arranged to establish said series circuit loop with both said load current flow and said energizing current flow flowing in the same direction therearound whereby the inductance of both of said inductors will maintain said load current flow.

4. A high current step generator arrangement useful for establishing and maintaining pinch effect in a plasma containing device, comprising: a load inductor arranged to induce rapidly rising flux in the plasma containing device; an auxiliary inductor having substantially more inductance than said load inductor; a first current source connectable for inducing in said auxiliary inductor an energizing current flow of the order of thousands of amperes; first switch means for coupling said first current source to said auxiliary inductor; a second current source connectable for inducing a load current flow of the order of thousands of amperes in said load inductor during a rise time of the order of one microsecond or less; second switch means for sequentially coupling said second current source to said load inductor with the sequence being such that at the instant said load inductor first carries its maximum load current flow said auxiliary inductor carries a substantially equal energizing current flow; and other switch means for sequentially coupling said auxiliary inductor and said load inductor in a series circuit loop with the sequence being such that coupling is accomplished at the instant when both said load current flow and said energizing current flow are substantially equal and when said load current flow first reaches its maximum value, said first, second and other switch means being arranged to establish said series circuit loop with both said load current flow and said energizing current flow flowing in the same direction therearound whereby the inductance of both of said inductors will maintain said load current flow.

5. A high current step generator arrangement comprising: a load inductor; means to initially energize said conductor to a load current flow of the order of thousands of amperes during a rise time of the order of one microsecond or less, an auxiliary inductor substantially more inductive than the load inductor; means for inducing in said auxiliary inductor an energizing current flow similar in magnitude to the load current flow; and sequential switching means for initiating energizing of said auxiliary inductor, then for initiating energization of the load inductor and then for coupling said auxiliary inductor and the load inductor in a series circuit loop at the instant when both the load current flow and said energizing current flow are substantially equal and the load current flow first reaches its maximum, said switching means being arranged to establish said series circuit loop with both the load current flow and said energizing current flow flowing in the same direction therearound whereby both inductors will maintain said load current flow.

6. A high current step generator arrangement useful for establishing and maintaining pinch effect in a plasma containing device, comprising: a load inductor arranged to induce rapidly rising flux in the plasma containing device; an auxiliary inductor having substantially more inductance than said load inductor; a first current source connectable for inducing in said auxiliary inductor an energizing current flow of the order of thousands of amperes; first switch means for coupling said first current source to said auxiliary inductor; a second current source connectable for inducing a load current flow of the order of thousands of amperes in said load inductor during a rise time of the order of one microsecond or less; second switch means for sequentially coupling said second current source to said load inductor with the sequence being such that, at the instant said load inductor first carries its maximum load current flow said auxiliary inductor carries a substantially equal energizing current flow; other switch means for sequentially coupling said auxiliary inductor and said load inductor in a series circuit loop with the sequence being such that coupling is accomplished at the instant when both said load current flow and said energizing current flow are substantially equal and when said load current flow first reaches its maximum value, said first, second and other switch means being arranged to establish said series circuit loop with both said load current flow and said energizing current flow flowing in the same direction therearound whereby the inductance of both of said inductors will maintain said load current flow; first impedance means connected in circuit with said first switch means; and second impedance means connected in circuit with said second switch means, said first and second impedance means being of an impedance which will quickly dampen any transient currents in said series circuit loop without substantially reducing the current rise time of said load inductor.

References Cited by the Examiner

UNITED STATES PATENTS 3,016,342 1/62 Kruskal et al. ---------- 204—193

LLOYD McCOLLUM, *Primary Examiner.*